(12) United States Patent
Zeng et al.

(10) Patent No.: US 11,668,998 B2
(45) Date of Patent: Jun. 6, 2023

(54) MATTE BOX ASSEMBLY

(71) Applicant: TILTA INC., Burbank, CA (US)

(72) Inventors: Wenping Zeng, Burbank, CA (US); Kefeng Zhou, Burbank, CA (US)

(73) Assignee: TILTA INC., Burbank, CA (US)

( * ) Notice: Subject to any disclaimer, the term of this patent is extended or adjusted under 35 U.S.C. 154(b) by 813 days.

(21) Appl. No.: 16/690,138

(22) Filed: Nov. 21, 2019

(65) Prior Publication Data

US 2021/0157215 A1   May 27, 2021

(51) Int. Cl.
G03B 17/14 (2021.01)
G02B 7/00 (2021.01)
G02B 7/02 (2021.01)

(52) U.S. Cl.
CPC ............. *G03B 17/14* (2013.01); *G02B 7/006* (2013.01); *G02B 7/022* (2013.01)

(58) Field of Classification Search
CPC .... G03B 17/14; G03B 17/566; G03B 11/045; G02B 7/006; G02B 7/022
See application file for complete search history.

(56) References Cited

U.S. PATENT DOCUMENTS 4,533,212 A * 8/1985 Shimizu ................. G03B 17/12
359/892

\* cited by examiner

*Primary Examiner* — James C. Jones
(74) *Attorney, Agent, or Firm* — Loza & Loza, LLP; Derek Yeung

(57) ABSTRACT

A matte box assembly has a body that allows an optical filter to be installed at the frontmost portion of the body. The matte box assembly has a lens coupler that can couple the body to a lens without causing damage to the lens. The matte box assembly has a flag that can pivot against the body to shield light from a desired direction. The matte box assembly provides various attachment points for accessories.

15 Claims, 4 Drawing Sheets

MATTE BOX ASSEMBLY

TECHNICAL FIELD

The present disclosure relates generally to a matte box for use on a camera, and in particular, a matte box with a front mounted camera filter holding mechanism.

INTRODUCTION

A matte box is commonly used with a camera to provide adjustable light shielding to the lens. The matte box can block light from one or more directions to reduce lens flare and glare. The matte box may include a filter mounting mechanism for using one or more filters to achieve a desired cinematographic or photographic effect. Commonly used filter sizes include 4×5.65 inch, 6×6 inch, and 4×4 inch. A typical matte box may be mounted onto a lens using a clamping mechanism that could cause damage to a lens if too much pressure is applied to the lens by the clamping mechanism. A typical matte box may have a filter mounting mechanism that is cumbersome, not user friendly, bulky, and heavy. A typical matte box may be limited in compatible filter sizes and lens sizes. Aspects of the present disclosure provide a matte box assembly that provide various improvement over the existing art.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

A matte box assembly has a body that allows an optical filter to be installed at the frontmost portion of the body. The matte box assembly has a lens coupler that can couple the body to a lens without causing damage to the lens. The matte box assembly has a flag that can pivot against the body to shield light from a desired direction. The matte box assembly provides various attachment points for accessories.

In one embodiment, a matte box assembly includes a body, a lens coupler, and a filter holder. The body has a first side and a second side opposite the first side. The lens coupler is removably connected to the first side of the body and configured to removably couple the body to the lens. The filter holder is on the second side of the body, and the filter holder is configured to removably secure a filter (e.g., a rectangular filter) at a frontmost portion of the body.

In one embodiment, a lens coupler has a first portion with a first diameter configured to be received in an opening of a matte box, and a second portion with a second diameter and an external thread configured to engage an internal thread of a lens. The lens coupler further includes an internal thread configured to engage an external thread of a circular filter installed in a center opening of the lens coupler.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Aspects of the present disclosure provide a matte box with a filter holding mechanism that facilitates easy and quick installation, removal, and interchange of filters. Matte boxes that are commonly used with professional cameras are typically large and bulky. Recently, prosumer type cameras have improved significantly in video and photo quality. In some applications, smaller cameras may be used to shoot professional quality video and/or photos. Aspects of the present disclosure provide a matte box assembly adapted for use with smaller cameras. Aspects of the present disclosure provide a matte box assembly with a filter holding mechanism that allows fast and easy filter changes.

Figure 2:
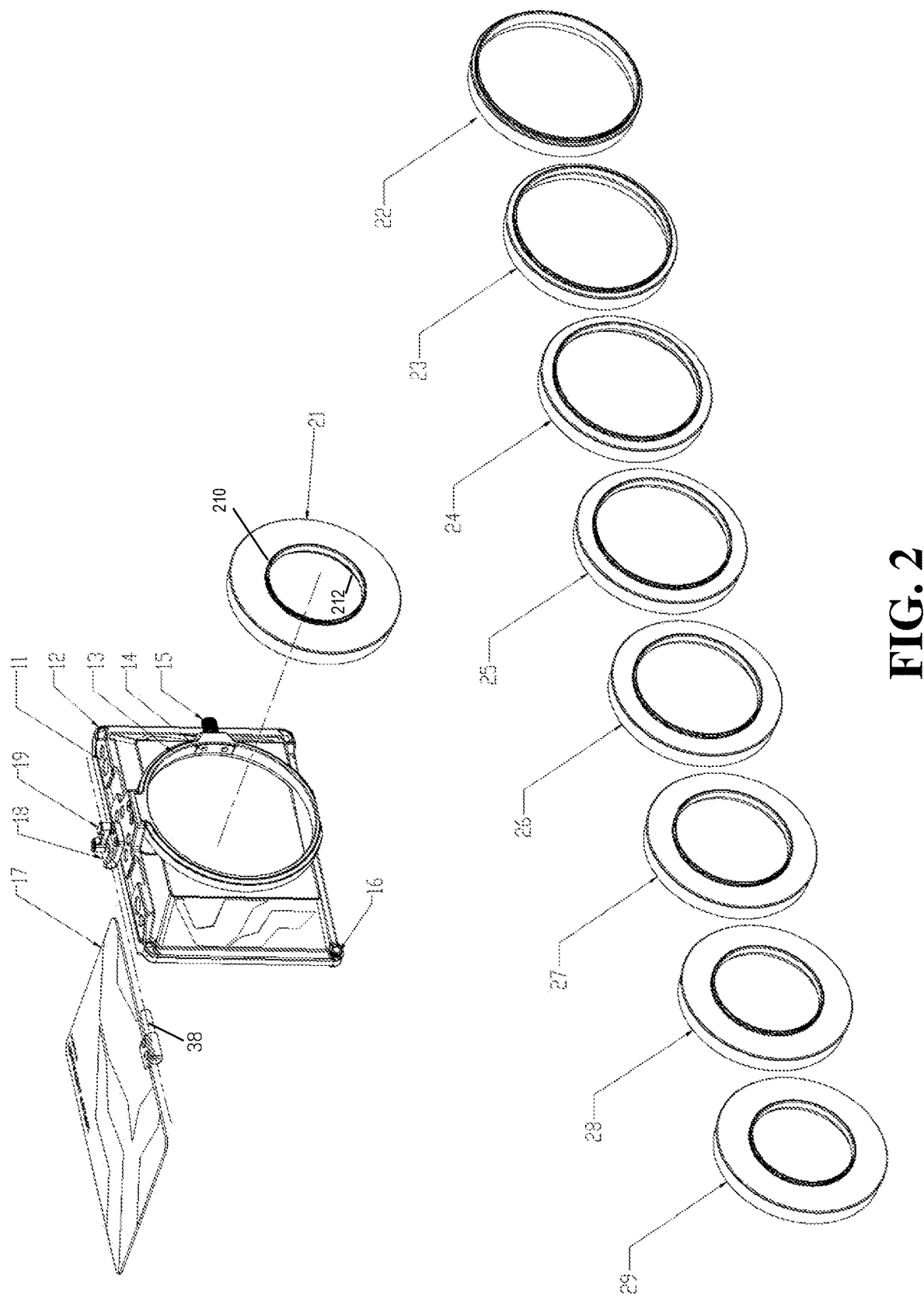
FIG. 2 is a drawing illustrating a perspective view of the matte box assembly of FIG. 1 and various lens couplers according to an embodiment.

Referring now to the drawings, a matte box assembly 1 includes a body 12, a top plate 11, one or more flags 17, and a lens coupler 2. The body 12 (matte box) has a funnel shaped open end. In one example, the open end may have a rectangular shape. In other examples, the open end may have other suitable shapes. The internal surface of the body is matte, non-glossy, or non-reflective to reduce light reflection and diffusion. In some embodiments, the top plate 11 (see FIG. 2) may have one or more attachment points (e.g., threaded holes) and/or cold shoe mount that may be used to attach various accessories (e.g., microphone, flashlight, etc.). In one embodiment, a flag (e.g., flag 17) may be movably attached to the top plate 11 via a quick release mechanism that allows the flag to pivot or rotate around an axis parallel to the top plate. In one embodiment, the flag 17 may have a bolt 38 (see FIG. 2) or the like that can removably slide into a socket 18 attached to the top plate 11, such that the flag 17 may rotate or pivot (e.g., at least 180 degrees) with respect to the body 12 or top plate 11. A user may turn a hand knob 19 clockwise to secure the bolt 38 inside the socket 18, and turn the hand knob 19 counter-clockwise to release the bolt 38 from the socket 18.

Figure 1:
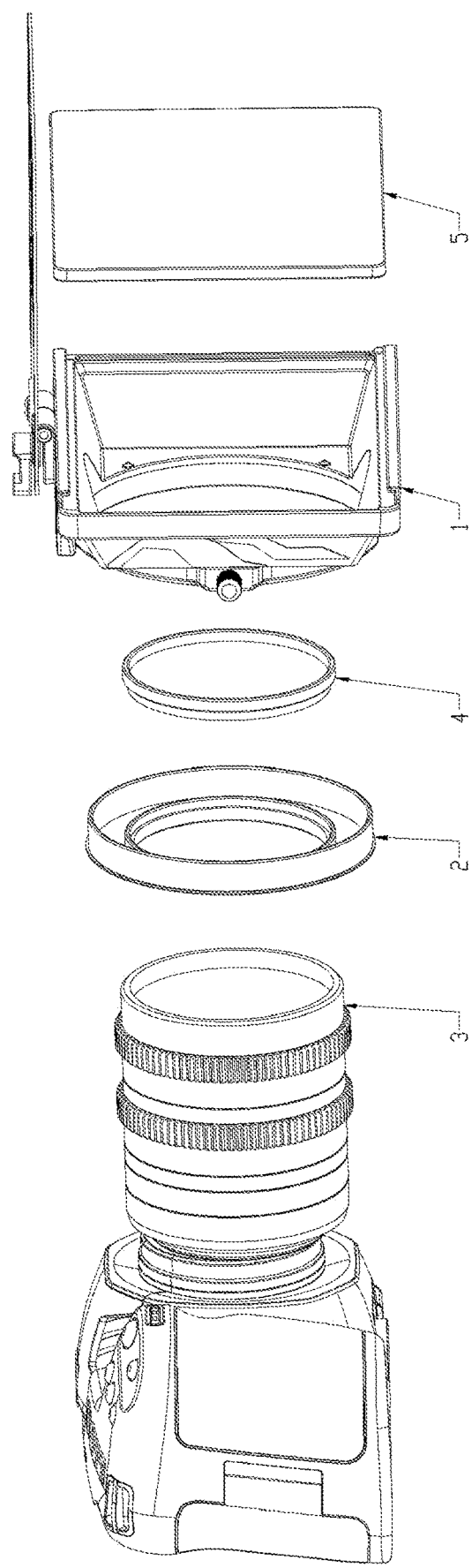
FIG. 1 is a drawing illustrating a matte box assembly and a camera according to an embodiment.

The matte box assembly may be coupled to a lens 3 via the lens coupler (e.g., lens coupler 2 shown in FIG. 1). The lens coupler 2 is interposed between the body 12 and the lens 3 for preventing intrusion of light between the matte box assembly 1 and the lens 3. The lens coupler 2 may have an external thread and an internal thread (e.g., external thread 210 and internal thread 212 shown in FIG. 2). The external thread is located on one end of the lens coupler 2 facing the lens. The external thread of the lens coupler 2 is configured to engage an internal thread of the lens 3. In some examples, the diameter of the external thread of the lens coupler may be substantially the same as the outside diameter of the lens coupler (e.g., lens coupler 22). In some examples, the diameter of the external thread of the lens coupler may be smaller than the outside diameter of the lens coupler (e.g., lens coupler 21, 23, 24, 25, 26, 27, 28, 29 shown in FIG. 2). The internal thread of the lens coupler is configured to match an external thread of a filter or dust cover that may be attached to the lens coupler. The matte box assembly may be used with different lens couplers (e.g., lens couplers 21, 22, 23, 24, 25, 26, 27, 28, 29 shown in FIG. 2) that have various diameters and thread configurations for connecting with lens of various sizes and thread configurations. The plurality of lens couplers have the same outside diameter that is sized to be snugly received into an opening of a fastening mechanism (e.g., see tube portion 13 shown in FIG. 3) that will be described in more detail below.

Figure 3:
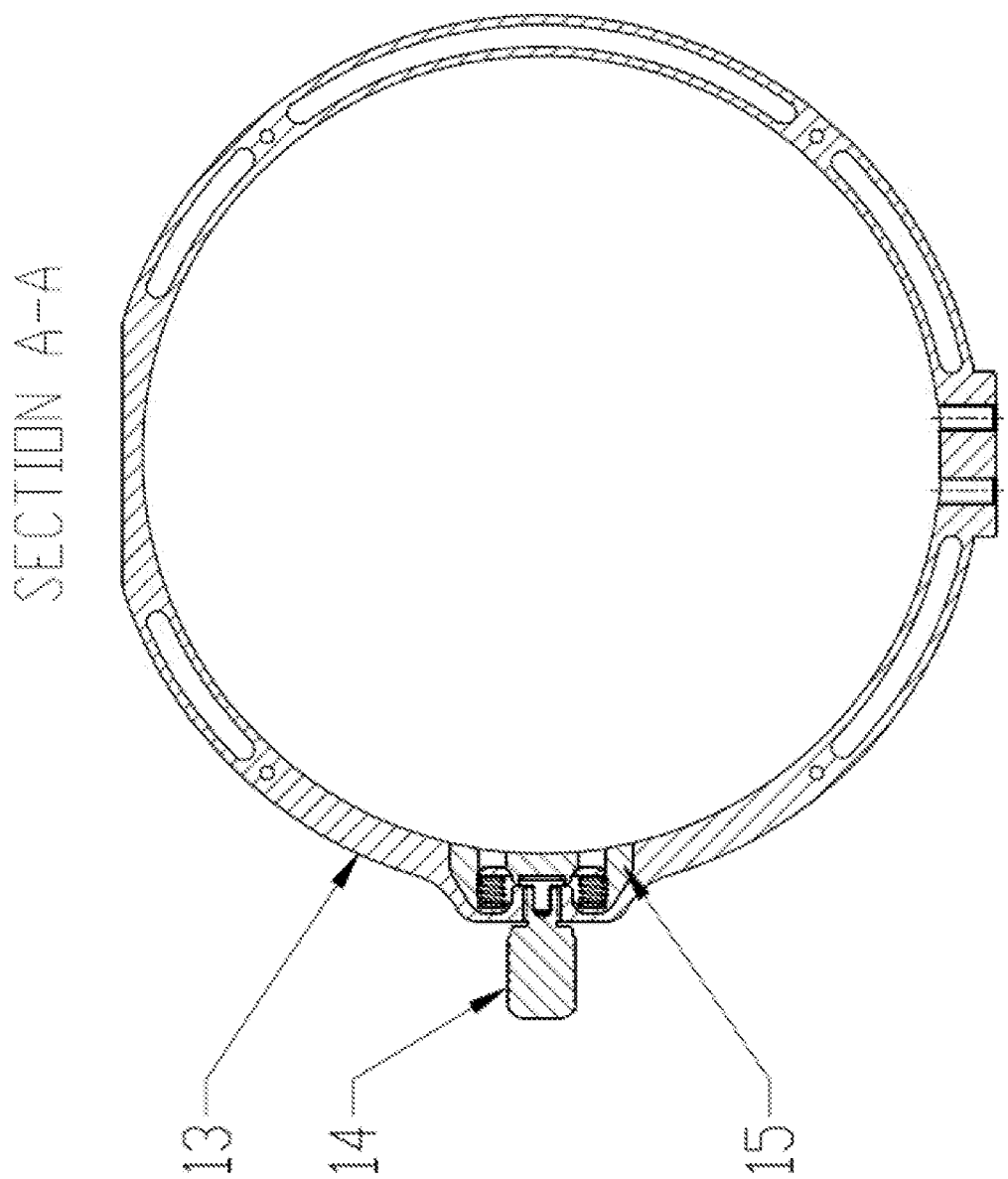
FIG. 3 is a drawing illustrating a lens coupler fastening mechanism according to an embodiment.
Figure 3:
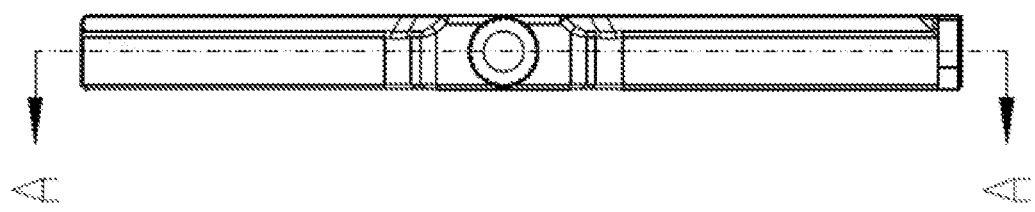

In one embodiment, the matte box assembly has a fastening mechanism with an opening that is sized to match the external diameter of the lens coupler. Referring to FIG. 3, the fastening mechanism may include a tube portion 13, a thumb screw 14, and a slider 15. A user may twist the thumb screw 14 in a clockwise direction (i.e., tightening the thumb screw) to move the slider 15 toward the center of the tube portion 13, thereby putting pressure on the lens coupler that is inserted into the tube portion 13. A user may twist the thumb screw 14 in a counter-clockwise direction (i.e., loosening the thumb screw) to move the slider 15 away from the center of the tube portion 13, thereby releasing the lens coupler from the tube portion 13. A user may adjust the angular position of the body 12 with respect to the lens by rotating the lens coupler inside the tube portion 13 when the thumb screw 14 is loosened. Other mechanisms to secure the lens coupler in the tube portion 13 are also contemplated in this disclosure.

In a first configuration, the lens coupler is attached to the lens, and a circular filter is attached to the lens coupler. To that end, the external thread of the lens coupler engages the internal thread of the lens, and the internal thread of the lens coupler engages the external thread of the filter. In a second configuration, a filter is attached to the lens, a lens coupler is attached to the filter, and a dusk cover is attached to the lens coupler. To that end, the external thread of the filter engages the internal thread of the lens, and the external thread of the lens coupler 2 engages the internal thread of the filter.

Figure 4:
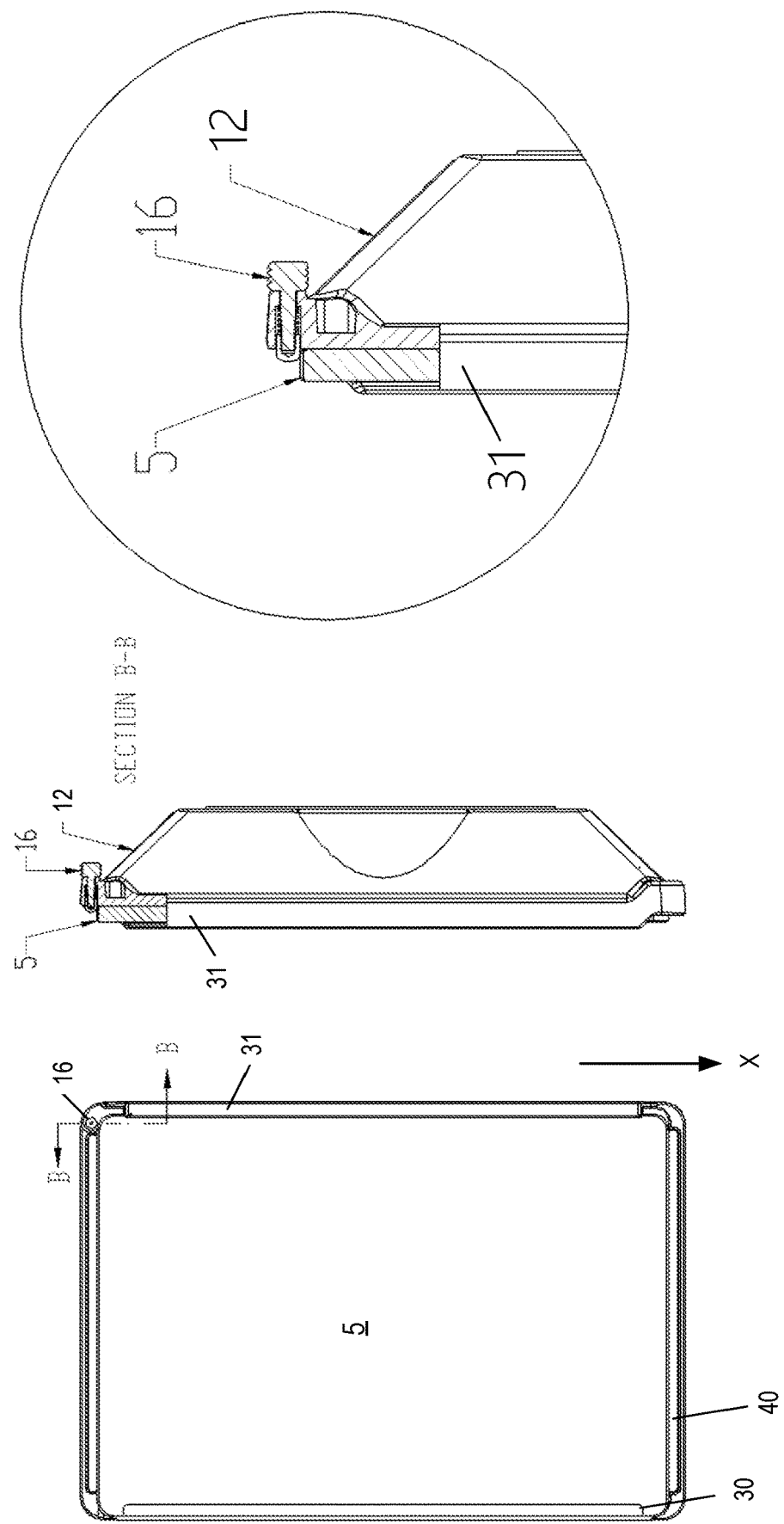
FIG. 4 is a drawing illustrating a safety mechanism for securing a filter on the frontmost portion of the matte box assembly according to an embodiment.

A rectangular filter 5 (see FIGS. 1 and 4) can be held and secured at the front portion (frontmost) of the body 12 by a filter holder, such that the lens coupler 2 and the rectangular filter 5 are respectively positioned on opposite sides of the body 12. In one embodiment, the rectangular filter 5 may be a 4×5.65 inch filter. However, the present disclosure is not limited to any particular filter sizes. In one embodiment, the filter holder consists of two guides 30 and 31 (see FIG. 4), and the rectangular filter 5 slides into a space defined by the guides respectively located on the top and bottom side of the body 12. The guides are shaped and positioned to receive and retain the rectangular filter 5. In one embodiment, the guides may be angled bars that extend in parallel in a length direction (direction X in FIG. 4) of the body. Because the rectangular filter 5 is located at the front of the matte box assembly (e.g., at the frontmost portion of the body 12), a user can easily install, remove, and replace the filter without changing other settings of the matte box assembly, thereby improving the usability of the matte box assembly. In one example, the angled bars 30, 31 and the body 12 form two slots respectively on the top and bottom sides of the body. Each slot extends over a suitable distance along the top or bottom edges of the body to secure the filter in front of the opening of the body 12. In other embodiments, other means for securing the filter 5 in front of the opening of the body 12 are also contemplated.

The matte box assembly has a suitable safety mechanism to prevent the filter 5 from sliding out from the slots created by the guides 30 and 31. In one embodiment, the safety mechanism may include a safety pin 16 or the like (e.g., a retractable pin) that is moveably installed at a side or corner portion of the body 12. The pin 16 may move in a direction that is substantially perpendicular to the sliding direction of the filter. The sliding direction is parallel to the length or longitudinal direction (e.g., direction X in FIG. 4) of the guides 30 and 31. The safety pin 16 may be biased such that the safety pin 16 remains in the lock position when it is not operated (i.e., not retracted). In one example, the safety pin 16 may be biased by a spring or the like to keep the safety pin in the lock position (released position). In the lock position, the safety pin 16 can block the rectangular filter 5 from sliding in a direction toward the safety pin 16. When the safety pin 16 is retracted, the filter 5 may be installed or removed from the filter holder. In one embodiment, one side of the body 12, opposite to the side where the safety pin is located, may include a stop, flange, ridge, or protrusion 40 that prevents the rectangular filter 5 from sliding out from the guides 30 and 31 in a direction away from the safety pin 16.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A matte box assembly for a lens coupled to a camera, comprising:
    a body comprising a first side and a second side opposite the first side, the body having a funnel shaped open end;
    a lens coupler removably connected to the first side of the body and configured to removably couple the body to the lens; and
    a filter holder on the second side of the body, the filter holder configured to removably secure a filter at a frontmost portion of the body, wherein the filter holder comprises
    a first guide located on a top edge of the body; and
    a second guide located on a bottom edge of the body, wherein the first guide, the second guide, and a side of the body defining a space for receiving the filter.

2. The matte box assembly of claim 1, wherein the first guide comprises a first angled bar, and the second guide comprises a second angled bar that extends in parallel with the first angled bar.

3. The matte box assembly of claim 1, further comprising a safety mechanism configured to engage an edge of the filter to prevent the filter from sliding out from the filter holder.

4. The matte box assembly of claim 3, wherein the safety mechanism comprises a retractable pin that is moveable between a retracted position and a released position, the retractable pin at the released position configured to prevent the filter from sliding out from the filter holder.

5. The matte box assembly of claim 3, wherein the body comprises a protrusion for preventing the filter from sliding out from the filter holder, the protrusion and the safety mechanism respectively located on opposite sides of the body.

6. The matte box assembly of claim 1, wherein the lens coupler comprises an internal thread and an external thread, the external thread configured to engage an internal thread of the lens, the internal thread configured to engage an external thread of a circular filter.

7. The matte box assembly of claim 1, wherein the lens coupler comprises an internal thread and an external thread, the external thread configured to engage an internal thread of a circular filter that is installed on the lens.

8. The matte box assembly of claim 1, further comprising a flag removably connected to the body, the flag pivotable against the body to block light from a predetermined direction.

9. The matte box assembly of claim 8, further comprising a socket attached to the body and configured to receive a bolt attached to the flag.

10. The matte box assembly of claim 1, further comprising a fastening mechanism configured to receive a portion of the lens coupler.

11. The matte box assembly of claim 10, wherein the fastening mechanism comprises:
    a tube portion having an opening for receiving the lens coupler, a diameter of the opening being not smaller than a diameter of the lens coupler;
    a screw located at a circumference of the tube portion; and
    a slider controlled by the screw, the slider movable in a first direction toward a center of the opening to secure the lens coupler in the opening, and the slider movable in a second direction away from the center of the opening to release the lens coupler from the opening.

12. The matte box assembly of claim 1, wherein the lens coupler comprises:
    a first portion with a first diameter configured to be received in an opening of the body; and
    a second portion with a second diameter and an external thread configured to engage an internal thread of the lens.

13. The matte box assembly of claim 12, wherein the lens coupler further comprises an internal thread configured to engage an external thread of a circular filter installed in a center opening of the lens coupler.

14. The matte box assembly of claim 1, wherein the funnel shaped open end has a rectangular shape.

15. A matte box assembly for a lens coupled to a camera, comprising:
    a body comprising a first side and a second side opposite the first side;
    a lens coupler removably connected to the first side of the body and configured to removably couple the body to the lens; and
    a filter holder on the second side of the body, the filter holder configured to removably secure a filter at a frontmost portion of the body, the filter holder configured to position the filter further away from the camera than the lens coupler.

* * * * *